US011307301B2

(12) United States Patent
Yeh (10) Patent No.: US 11,307,301 B2
(45) Date of Patent: Apr. 19, 2022

(54) LOCATION DETECTION SYSTEM (71) Applicant: RichWave Technology Corp., Taipei (TW)

(72) Inventor: Chiang-Hua Yeh, Taipei (TW)

(73) Assignee: RichWave Technology Corp., Taipei (TW)

( * ) Notice: Subject to any disclaimer, the term of this patent is extended or adjusted under 35 U.S.C. 154(b) by 231 days.

(21) Appl. No.: 16/727,867

(22) Filed: Dec. 26, 2019

(65) Prior Publication Data
US 2020/0249340 A1 Aug. 6, 2020

Related U.S. Application Data (60) Provisional application No. 62/799,764, filed on Feb. 1, 2019.

(51) Int. Cl.
*G01S 13/46* (2006.01)
*G01S 7/35* (2006.01)
*G01S 13/536* (2006.01)

(52) U.S. Cl.
CPC .............. *G01S 13/46* (2013.01); *G01S 7/354* (2013.01); *G01S 13/536* (2013.01); *G01S 2013/468* (2013.01)

(58) Field of Classification Search
CPC ........ G01S 13/04; G01S 13/46; G01S 13/536; G01S 13/584; G01S 13/878; G01S 13/88; G01S 2013/468; G01S 7/354; G01S 13/06
See application file for complete search history.

(56) References Cited

U.S. PATENT DOCUMENTS

| 10,712,446 | B1* | 7/2020 | Bills | H01S 5/183 |
| 2004/0012516 | A1* | 1/2004 | Schiffmann | G01S 13/878 342/70 |
| 2005/0046606 | A1* | 3/2005 | Yoneda | G01S 13/878 342/70 |
| 2015/0109164 | A1* | 4/2015 | Takaki | G01S 7/41 342/27 |
| 2015/0169086 | A1* | 6/2015 | Wojtczuk | G01J 5/34 250/338.3 |
| 2016/0291144 | A1 | 10/2016 | Chang | |
| 2018/0372861 | A1* | 12/2018 | Degani | G01S 7/352 |
| 2020/0174113 | A1* | 6/2020 | Lee | G01S 13/931 |

FOREIGN PATENT DOCUMENTS

| CN | 102124370 A | 7/2011 |
| CN | 204666815 U | 9/2015 |
| CN | 108474854 A | 8/2018 |
| WO | 2018/152525 A2 | 8/2018 |

* cited by examiner

Primary Examiner — Timothy X Pham
(74) Attorney, Agent, or Firm — Winston Hsu (57) ABSTRACT

A location detection system includes a first directional radar sensor, a second directional radar sensor and a controller. The first directional radar sensor has a first facing direction and a first radio coverage correspondingly, and is used to receive a first response signal upon detecting an object. The second directional radar sensor has a second facing direction and a second radio coverage correspondingly, the second radio coverage being partially overlapping with the first radio coverage, and is used to receive a second response signal upon detecting the object. The controller is used to determine which region the object is located in according to receptions of the first response signal and the second response signal.

19 Claims, 7 Drawing Sheets

LOCATION DETECTION SYSTEM

CROSS REFERENCE TO RELATED APPLICATION

This non-provisional application claims priority of U.S. provisional application No. 62/799,764, filed on 1 Feb. 2019, included herein by reference in its entirety.

TECHNICAL FIELD

The invention relates to radar detection, and more particularly, to a location detection system employing multiple radar sensors to detect a location of a moving object.

BACKGROUND

The use of radar in indoor applications is growing rapidly. In particular, radar finds a wide range of applications in the field of location detection in indoor environments inside residential, commercial or industrial facilities. Continuous-wave (CW) radar and frequency-modulated continuous-wave (FMCW) radar may be used to detect a location or a motion of a moving object such as a human target. Often, conventional indoor location detection systems suffer from high false detection rates owing to microwave signals emitted from radar passing through walls to detect a human target outside a building or a room. When the conventional indoor location detection systems are applied to intrusion detection applications, the high false detection rates may impose additional costs on local police departments or security companies to answer these false alarms.

Radar typically measures locations of target objects in polar coordinates, and the location of each target object is represented by a distance and an angle. A conventional radar employs a highly directive antenna in a complicated angle measuring process to determine the azimuth angle and the elevation angle of a target object. Further, in a conventional FMCW radar, a wide sweep bandwidth is used to achieve a high range resolution to enhance the ability to distinguish between two or more closely-spaced target objects.

Thus, a need has arisen for a location detection system to detect a location of an object by employing only limited bandwidth and no complicated angle measurement, while preventing undesirable through-wall detection.

SUMMARY

In one aspect of the invention, a location detection system including a first directional radar sensor, a second directional radar sensor and a controller is provided. The first directional radar sensor has a first facing direction and a first radio coverage correspondingly, and is used to receive a first response signal upon detecting an object. The second directional radar sensor has a second facing direction and a second radio coverage correspondingly, the second radio coverage being partially overlapping with the first radio coverage, and is used to receive a second response signal upon detecting the object. The controller is used to determine which region the object is located in according to receptions of the first response signal and the second response signal.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The present invention is directed to a location detection system employing two or more directional radar sensors to detect the location of a moving or stationary target object. The location detection system may define a regular-shaped space (e.g., a rectangular-shaped space or a square-shaped space, or an L-shaped space), and determine a location of an object inside the defined regular-shaped space using the two or more directional radar sensors. Exemplary embodiments of the location detection system may be applied to indoor applications such as intrusion detection and home automation. In home automation applications, the location detection system may be incorporated into a smart home appliance to operate according to the location of a user. For example, when used in a smart speaker, the location detection system may detect that a user has entered a living room in which the smart speaker is located and determine the location of the user, and the smart speaker may adaptively decrease the volume if the user stands close to the smart speaker, and adaptively increase the volume as the user moves away from the smart speaker. In another example, when used in a smart kettle located in a kitchen, the location detection system may detect that a young child has stepped into the kitchen when the smart kettle is heating water, and the smart kettle may set off an alarm to warn about safety of the young child.

Figure 1:
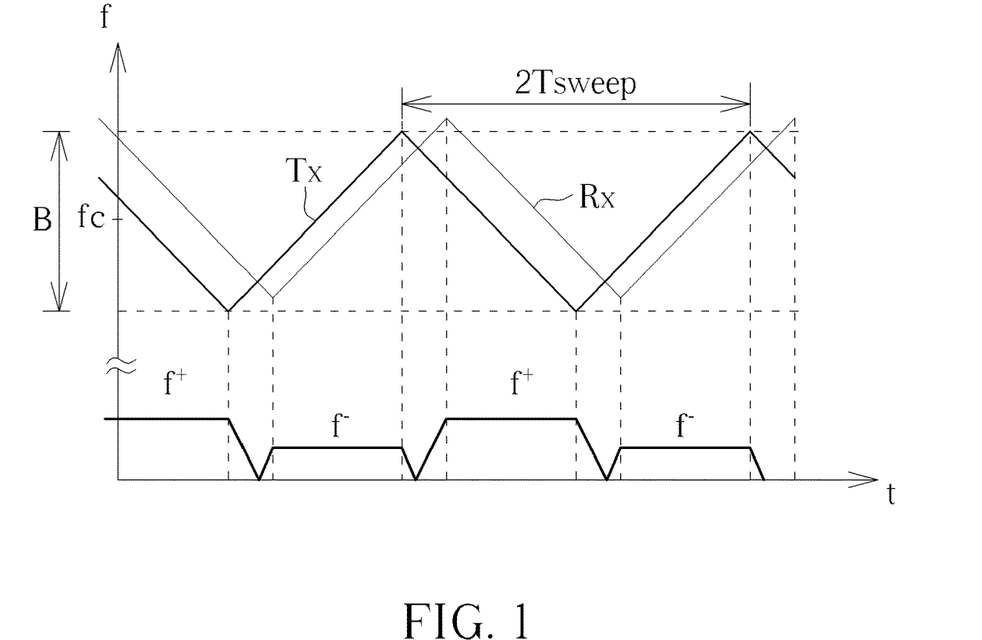
FIG. 1 shows waveforms generated and received, and beat frequencies derived by the FMCW radar in a general detection scenario.
Figure 2:
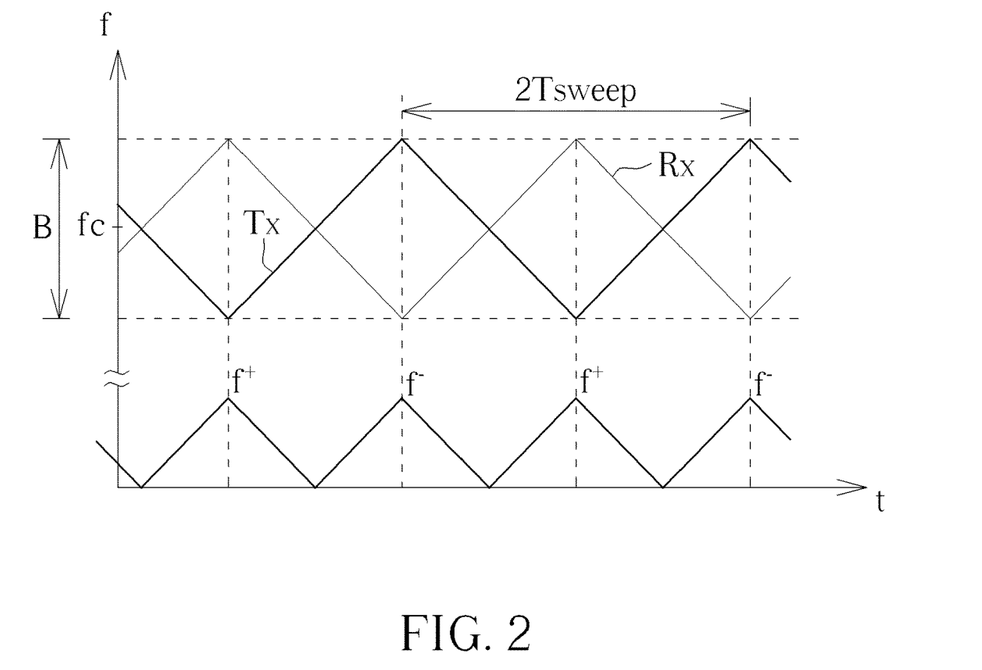
FIG. 2 shows waveforms generated and received, and beat frequencies derived by the FMCW radar in FIG. 1 in a maximum range detection scenario.

The two or more directional radar sensors may be continuous-wave (CW) radar or frequency-modulated continuous-wave (FMCW) radar. The CW radar may emit a constant-frequency continuous-wave radar signal to detect a movement, moving direction and velocity of a target object by using the Doppler effect. The CW radar may not determine a distance of the target object from the CW radar or distinguish different target objects in the same direction. In comparison to the CW radar, the FMCW radar may emit a linear frequency modulated continuous wave radar signal, as depicted in FIGS. 1 and 2, to detect a movement, moving direction and velocity of a target object, as well as detecting a distance of the target object from the FMCW radar. Specifically, the FMCW radar may be characterized by a maximum radio range Rmax and a range resolution ΔR, where the maximum radio range Rmax specifies a maximum distance from the FMCW radar that a target object may be detected, and the range resolution ΔR specifies a minimum distance that two or more target objects should be set apart for the FMCW radar to clearly distinguish between the two or more target objects. The maximum radio range Rmax and the range resolution ΔR define the ability of an FMCW radar to detect target objects, and may be respectively determined according to a sampling rate and a sweep bandwidth B, as explained in FIGS. 1 and 2 below.

FIGS. 1 and 2 show waveforms transmitted and received, and intermediate frequency signals derived by the FMCW radar in a general detection scenario and a maximum range detection scenario, respectively, where the horizontal axes represent time and the vertical axes represent frequency. In the general detection scenario in FIG. 1, a target object is located within the maximum radio range Rmax, and in the maximum range detection scenario in FIG. 2, a target object is located at the maximum radio range Rmax. In FIGS. 1 and 2, transmission signals Tx are triangular frequency modulated waveform having a sweep bandwidth B and a sweep duration 2Tsweep. The transmission signals Tx are transmitted by the FMCW radar and reflected from the target object to generate response signals Rx. The response signals Rx have waveform patterns similar to those of the transmission signals Tx but are shifted in time and frequency. The FMCW radar receives the response signals Rx, and generates the frequency differences between the transmission signals Tx and the respective response signals Rx for the up chirp and the down chirp to determine the intermediate frequency signals comprising two differential frequencies f+ and f−. An arithmetic average of the two differential frequencies f+ and f− is used to compute a distance of the target object from the FMCW radar, and the Doppler frequency associated with beat frequencies of f+ and f− is used to calculate the velocity of the target object when the target object moves. The intermediate frequency signals are sampled by an analog to digital converter (ADC) to determine the differential frequencies f+ and f−, thus a sampling rate of the ADC imposes a limit on the maximum frequencies of the intermediate frequency signals, and also on the maximum radio ranges Rmax of the FMCW radar. Therefore the maximum radio range Rmax may be determined by the sampling rate of the ADC, and expressed by Equation (1):

$$R_{max} = \frac{F_S * c}{2S} = \frac{F_S * c * Tsweep}{2B} \qquad \text{Equation (1)}$$

where B is the sweep bandwidth;
$F_s$ is the sampling rate of an ADC, $F_s \geq S2R/c$;
c is the speed of light, $c=3\times10^8$ m/s;
S is the slope of a chirp and equal, S=B/Tsweep; and
Tsweep=Tchirp=chirp rate.

The range resolution ΔR can be expressed by Equation (2):

$$\Delta R = \frac{c}{2B} \qquad \text{Equation (2)}$$

where B is the sweep bandwidth;
c is the speed of light, $c=3\times10^8$ m/s; and
Tsweep=Tchirp=chirp rate.

As indicated in Equation (2) and FIGS. 1 and 2, the range resolution ΔR is inversely proportional to the sweep bandwidth B of the triangular waveform. In the embodiments, a narrow sweep bandwidth B may be used in the location detection system of the present invention, and the range resolution ΔR of the location detection system is limited. Instead, multiple directional radar sensors having partially overlapping radio coverage are used to identify two or more target objects and maintain optimum location detection accuracy.

Figure 3:
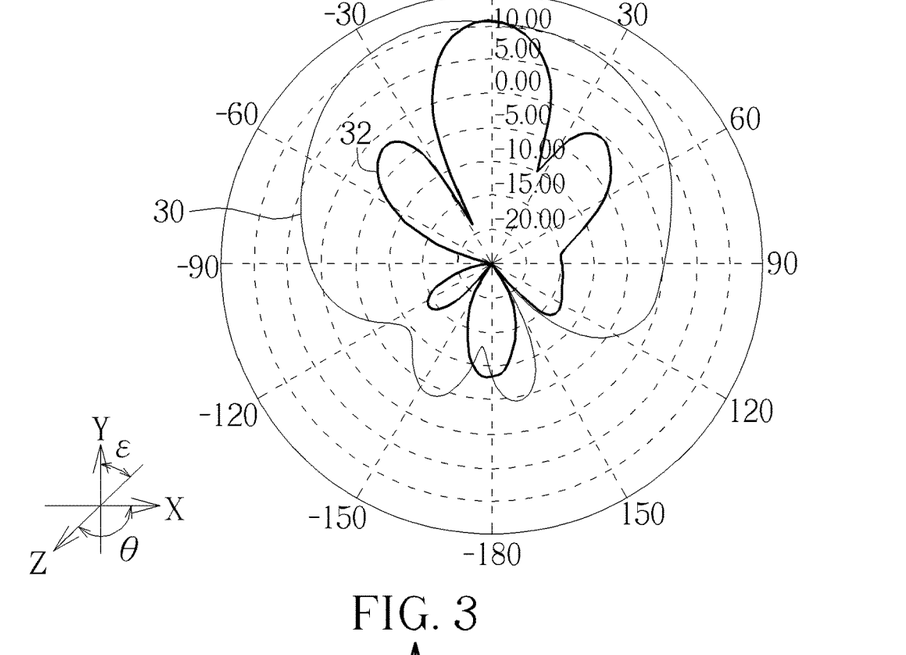
FIG. 3 shows radiation patterns of a directional antenna on an X-Z plane and a Y-Z plane.

As used herein, the directional radar sensors refer to radar including directional antennas, and each directional antenna may be a patch antenna and has radiation patterns of 180-degree azimuth beam coverage and 180-degree elevation beam coverage, as shown by a radiation pattern 30 and a radiation pattern 32 in FIG. 3, where the radiation pattern 30 is on the X-Z (azimuth) plane and the radiation pattern 32 is on the Y-Z (elevation) plane. Unwanted back lobes of the radiation patterns may be attenuated or suppressed by metal shielding fabricated at the back of each directional radar sensor.

Figure 4:
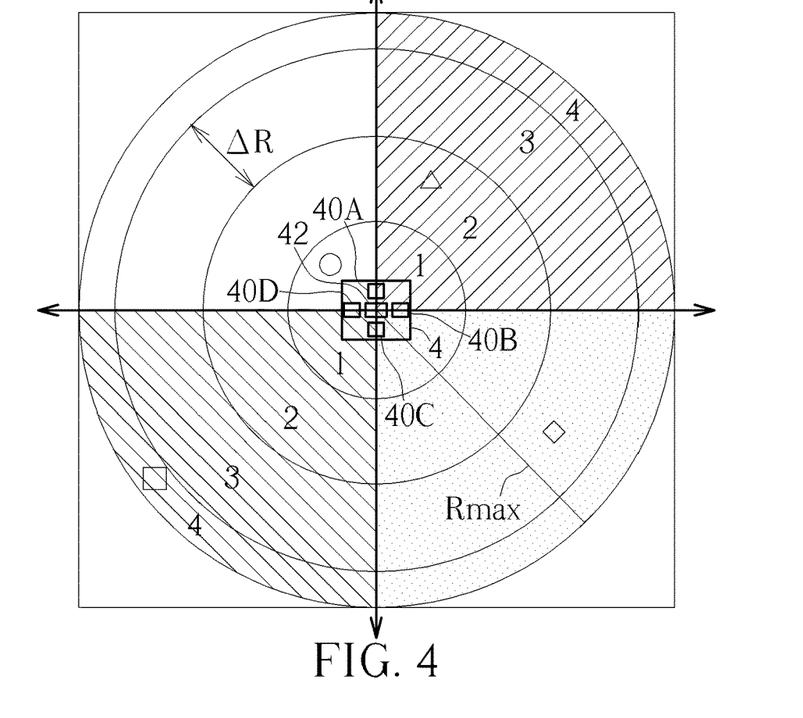
FIG. 4 is a top view of a location detection system detecting locations of objects in a room according to an embodiment of the invention.
Figure 5:
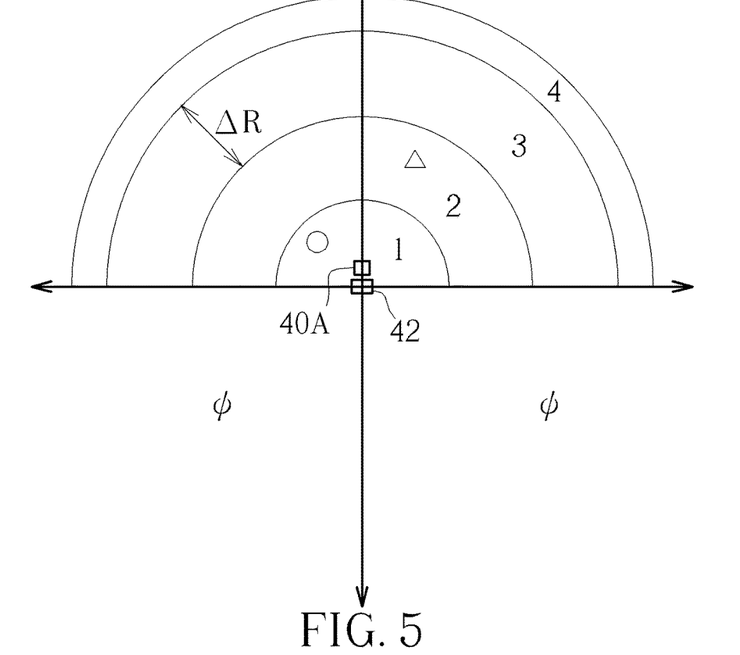
FIG. 5 shows radio coverage of a radar sensor in the location detection system in FIG. 4.
Figure 6:
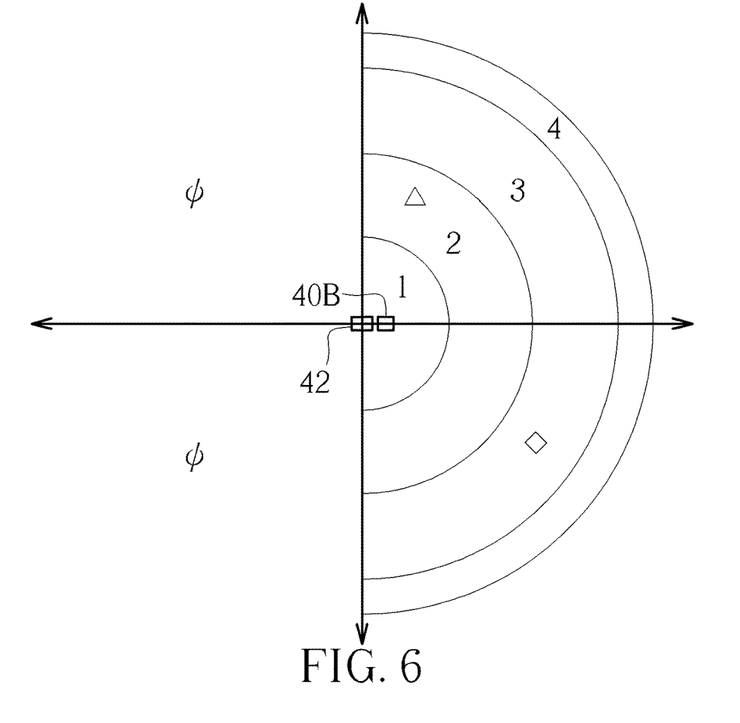
FIG. 6 shows radio coverage of another radar sensor in the location detection system in FIG. 4.
Figure 7:
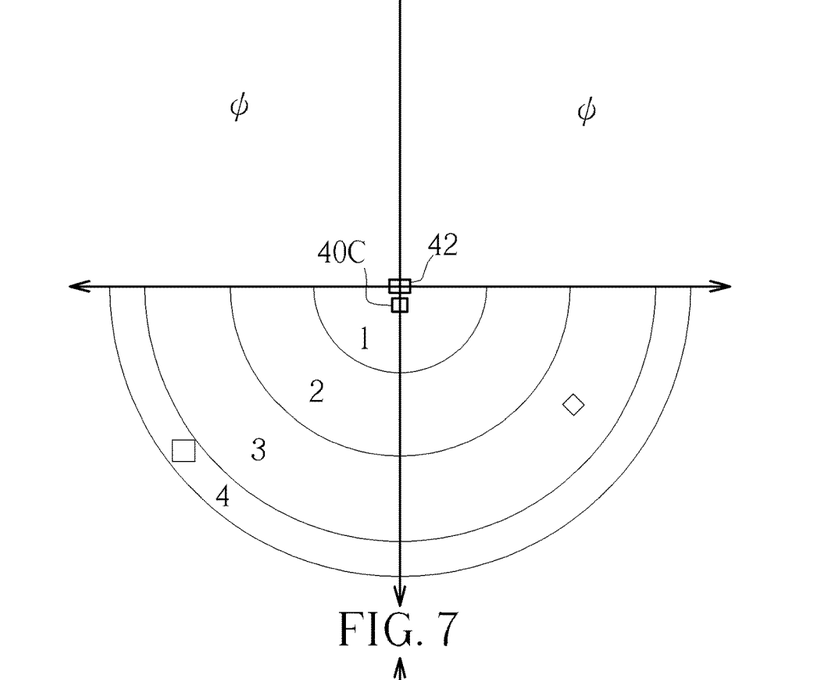
FIG. 7 shows radio coverage of another radar sensor in the location detection system in FIG. 4.
Figure 8:
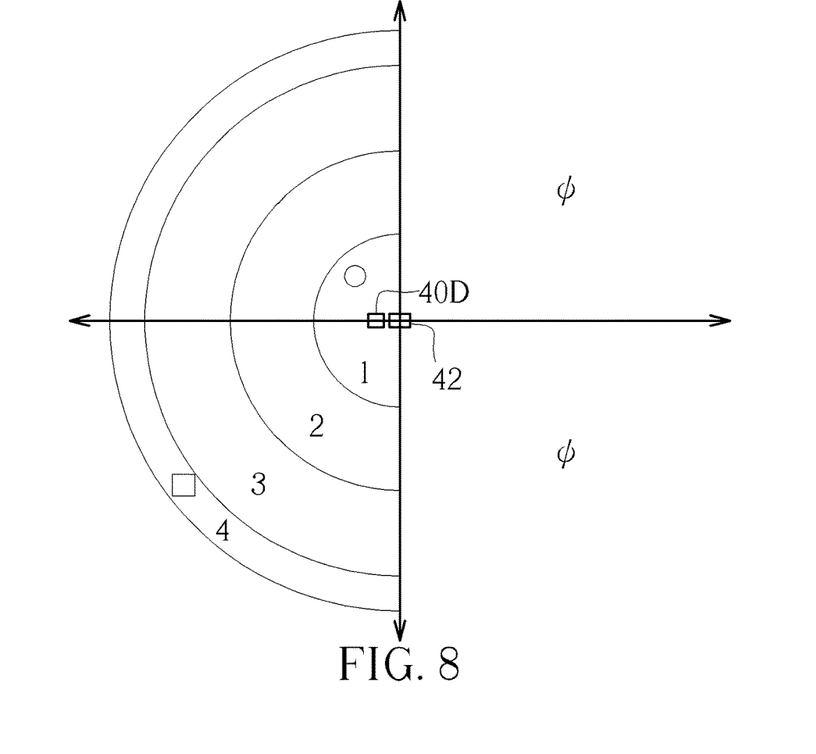
FIG. 8 shows radio coverage of another radar sensor in the location detection system in FIG. 4.

FIG. 4 is a top view of a location detection system 4 for detecting locations of objects in a room according to an embodiment of the invention, and FIGS. 5 to 8 show radio coverages of directional radar sensors 40A to 40D in the location detection system 4, respectively. The location detection system 4 comprises directional radar sensors 40A to 40D and a controller 42 coupled thereto, and may be installed at the center of a square or circular-shaped room to detect objects therein. The directional radar sensors 40A to 40D are FMCW radar having a maximum radio range Rmax and a range resolution ΔR. The maximum radio ranges Rmax may be divided into Zones 1 to 4 using the range resolution ΔR.

The directional radar sensors 40A to 40D have respective facing directions and radio coverages as shown in FIGS. 5 to 8, and are arranged next to each other facing different directions. The facing directions directional radar sensors 40A to 40D are the radial center lines of the respective radio coverages of the directional radar sensors 40A to 40D. Specifically, the directional radar sensors 40A and 40B face orthogonal directions and the respective radio coverages are partially overlapping with each other, the directional radar sensors 40B and 40C face orthogonal directions and the respective radio coverages are partially overlapping with each other, the directional radar sensors 40C and 40D face orthogonal directions and the respective radio coverages are partially overlapping with each other, and the directional radar sensors 40D and 40A face orthogonal directions and the respective radio coverages are partially overlapping with each other. Further, the facing direction of the directional radar sensor 40A and the facing direction of the directional radar sensor 40B may be different and coplanar, the facing direction of the directional radar sensor 40B and the facing direction of the directional radar sensor 40C may be different and coplanar, the facing direction of the directional radar sensor 40C and the facing direction of the directional radar sensor 40D may be different and coplanar, and the facing direction of the directional radar sensor 40D and the facing direction of the directional radar sensor 40A may be different and coplanar. The directional radar sensors 40A through 40D may cover identical or different radio ranges. In the embodiment, identical radio ranges are adopted by the directional radar sensors 40A through 40D to provide a circular radio coverage to the square or circular-shaped room. In one embodiment, the facing direction of the directional radar sensors 40A to 40D may be coplanar on the X-Z plane.

In the example, four objects are located in different regions of the room. Each region may be specified by a Zone and an overlapping area between respective radio coverages of two of the directional radar sensors 40A to 40D facing orthogonal directions. A triangle object is located in Zone 2 of an overlapping area between the radio coverages of the directional radar sensors 40A and 40B, a rhombus object is located in Zone 3 of an overlapping area between the radio coverages of the directional radar sensors 40B and 40C, a square object is located in Zone 4 of an overlapping area between the radio coverages of the directional radar sensors 40C and 40D, and a circle object is located in Zone 1 of an overlapping area between the radio coverages of the directional radar sensors 40D and 40A. The overlapping areas between the radio coverages of the directional radar sensors 40A and 40B, 40B and 40C, 40C and 40D, and 40D and 40A may be the first quadrant, second quadrant, third quadrant and fourth quadrant, respectively.

Each of the directional radar sensors 40A through 40D may emit a transmission signal and receive a response signal upon detecting an object. The transmission signals may propagate in the air and may be reflected to generate the response signals upon detecting the objects. If there is no object present in the respective radio coverages, the directional radar sensors 40A through 40D may not receive any response signal.

Despite that the controller 42 may use the response signals to compute distances of the objects from the location detection system 4, angles (directions) of the objects are unknown, thus the controller 42 may not determine which quadrant the circle object and the triangle object are located in using merely one response signal. The controller 42 may determine which quadrant each object is located in according to receptions of two or more respective response signals of two of the directional radar sensors 40A to 40D facing orthogonal directions. For example, the directional radar sensor 40A may receive two response signals indicating the circle object in Zone 1 and the triangle object in Zone 2, respectively, and the directional radar sensor 40B may receive two response signals indicating the triangle object in Zone 2 and the rhombus object in Zone 3, respectively. Consequently, the controller 42 may determine that the triangle object is located in Zone 2 of the first quadrant according to the response signals received by the directional radar sensors 40A and 40B. Similarly, the directional radar sensor 40C may receive two response signals indicating the rhombus object in Zone 3 and the square object in Zone 4, respectively, and the directional radar sensor 40D may receive two response signals indicating the square object in Zone 4 and the circle object in Zone 4, respectively. As a result, the controller 42 may determine that the circle object is located in Zone 1 of the second quadrant according the response signals received by the directional radar sensors 40A and 40D, determine that the square object is located in Zone 4 of the third quadrant according to the response signals received by the directional radar sensors 40C and 40D, and the rhombus object is located in Zone 3 of the fourth quadrant according to the response signals received by the directional radar sensors 40B and 40C.

Therefore, the location detection system 4 may employ four directional radar sensors to detect an object in a square or circular-shaped room using a narrow sweep bandwidth and a limited range resolution.

Figure 9:
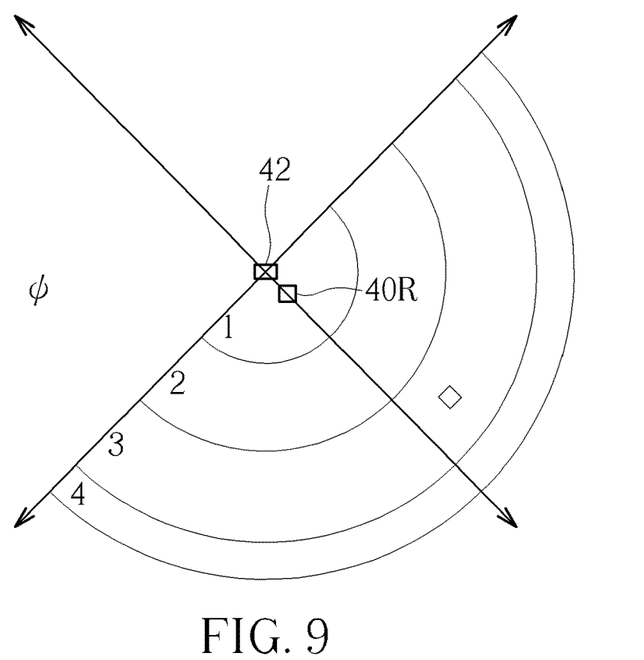
FIG. 9 shows radio coverage of a rotational sensor 40R.

FIG. 9 shows a radio coverage of a rotational sensor 40R. The location detection system 4 may adopt the rotational sensor 40R to further determine the location of an object with enhanced accuracy. The rotational sensor 40R may be rotatable to provide a desired radio coverage. Combined with the location detection system 4, the rotational sensor 40R may be arranged next to the directional radar sensors 40A to 40D and rotatable about the center of the location detection system 4. The rotational sensor 40R may emit a transmission signal and receive a response signal upon detecting an object. The controller 42 may be coupled to the rotational sensor 40R to determine which region the object is located in according to receptions of all response signals from the directional radar sensors 40A to 40D, and 40R.

Figure 10:
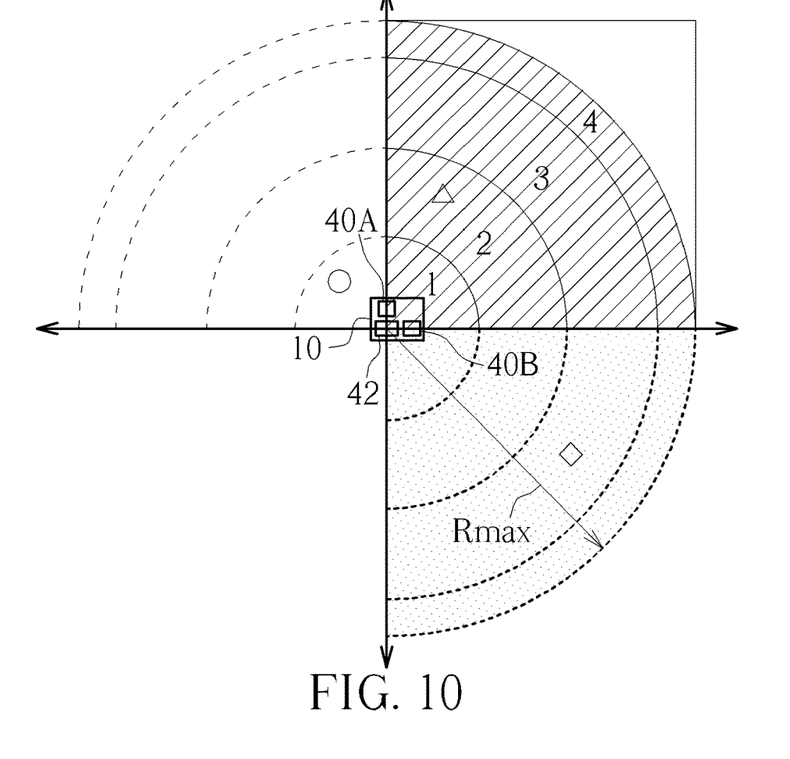
FIG. 10 is a top view of a location detection system according to another embodiment of the invention.

FIG. 10 is a top view of a location detection system 10 detecting locations of objects in a room according to another embodiment of the invention. The location detection system 10 comprises the directional radar sensors 40A and 40B and the controller 42 coupled thereto, and may be installed at the central corner of an L-shaped room to detect objects therein. The directional radar sensors 40A and 40B are FMCW radar having a maximum radio range Rmax and a range resolution ΔR, and the maximum radio ranges Rmax are divided into Zones 1 to 4. The directional radar sensors 40A and 40B are arranged next to each other facing different directions. Specifically, the directional radar sensors 40A and 40B face orthogonal directions and respective radio coverages are partially overlapping with each other. The directional radar sensors 40A and 40B may cover identical or different radio ranges. In the embodiment, identical radio ranges are adopted by the directional radar sensors 40A and 40B to provide a three-quarter circle radio coverage to the L-shaped room.

The controller 42 may determine which region the object is located in according to receptions of the respective response signals of the directional radar sensors 40A and 40B. The region of the object is selected from at least two non-overlapping regions and at least one overlapping region. The at least two non-overlapping regions may be the blank area in the second quadrant and the dotted area in the fourth quadrant. The at least one overlapping regions may be the dashed area in the first quadrant. For example, the directional radar sensor 40A may receive two response signals indicating the circle object in Zone 1 and the triangle object in Zone 2, respectively, and the directional radar sensor 40B may receive two response signals indicating the triangle object in Zone 2 and the rhombus object in Zone 3, respectively. The controller 42 may determine that the triangle object is located in Zone 2 of the first quadrant (overlapping region) according to the response signals received by the directional radar sensors 40A and 40B, determine that the circle object is located in Zone 1 of the second quadrant (non-overlapping region) since the response signal is only received by the directional radar sensor 40A but not the directional radar sensor 40B, and determine that the rhombus object is located in Zone 3 of the fourth quadrant (non-overlapping region) since the response signal is only received by the directional radar sensor 40B but not the directional radar sensor 40A.

In some embodiments, the location detection system 10 may be adopted in a square room, where location detection system 10 may be installed at a corner of the square room. The controller 42 may determine which region the object is located in only when receiving the response signals from both the directional radar sensors 40A and 40B. That is, the location detection system 10 only detects objects in the first quadrant. In the example, the controller 42 may determine which region the triangle object is located in when receiving the response signals from both the directional radar sensors 40A and 40B, and ignore the circle object and the rhombus object since the corresponding response signals are only received from one of the directional radar sensors 40A and 40B.

Therefore, the location detection system 10 may employ two directional radar sensors to detect an object in an L-shaped room using a narrow sweep bandwidth and a limited range resolution.

Figure 11:
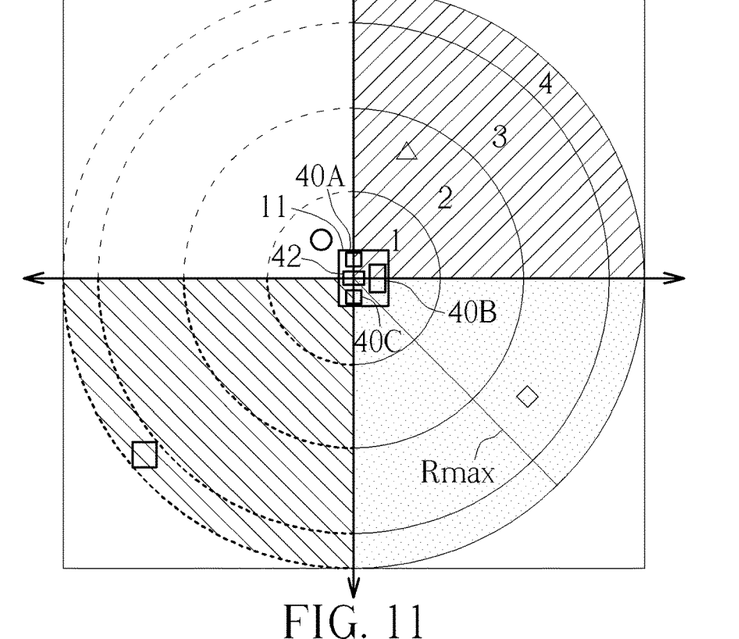
FIG. 11 is a top view of a location detection system according to another embodiment of the invention.

FIG. 11 is a top view of a location detection system 11 detecting locations of objects in a square or rectangular-shaped room according to another embodiment of the invention. The location detection system 10 comprises the directional radar sensors 40A to 40C and the controller 42 coupled thereto, and may be installed at the center or a corner of a square-shaped room, or on a wall of a rectangular-shaped room to detect objects therein. The directional radar sensors 40A to 40C are FMCW radar having a maximum radio range Rmax and a range resolution ΔR, and the maximum radio ranges Rmax are divided into Zones 1 to 4. The directional radar sensors 40A to 40C are arranged next to each other facing different directions. Specifically, the directional radar sensors 40A and 40B face orthogonal directions and respective radio coverages are partially overlapping with each other, the directional radar sensors 40B and 40C face orthogonal directions and respective radio coverages are partially overlapping with each other, and the directional radar sensors 40B and 40C face opposite directions and the radio coverage of the directional radar sensor 40C does not overlap with the radio coverage of the directional radar sensor 40A. The directional radar sensors 40A to 40C may cover identical or different radio ranges. In the embodiment, identical radio ranges are adopted by the directional radar sensors 40A to 40C to provide a circular radio coverage to the square room.

The controller 42 may determine which region the object is located in according to receptions of the respective response signals of the directional radar sensors 40A to 40C. In some embodiments, the location detection system 11 may be installed at the center of a square-shaped room. The region of the object is selected from at least two non-overlapping regions and at least two overlapping regions. The at least two non-overlapping regions may be the blank area in the second quadrant and the dashed area in the third quadrant. The at least two overlapping regions may be the dashed area in the first quadrant and the dotted area in the fourth quadrant. For example, the directional radar sensor 40A may receive two response signals indicating the circle object in Zone 1 and the triangle object in Zone 2, the directional radar sensor 40B may receive two response signals indicating the triangle object in Zone 2 and the rhombus object in Zone 3, and the directional radar sensor 40C may receive two response signals indicating the rhombus object in Zone 3 and the square object in Zone 4. The controller 42 may determine that the triangle object is located in Zone 2 of the first quadrant according to the response signals received by the directional radar sensors 40A and 40B, determine that the rhombus object is located in Zone 3 of the fourth quadrant according to the response signals received by the directional radar sensors 40B and 40C, determine that the circle object is located in Zone 1 of the second quadrant since the response signal is only received by the directional radar sensor 40A but not the other directional radar sensors 40B and 40C, and determine that the square object is located in Zone 4 of the third quadrant since the response signal is only received by the directional radar sensor 40C and not the other directional radar sensors 40A and 40B.

In other embodiments, the location detection system 11 may be installed on a wall of a rectangular room. The controller 42 may determine which region the object is located in only when receiving the response signals from the directional radar sensor 40B and one of the directional radar sensors 40A and 40C. That is, the location detection system 11 only detects objects in the first quadrant and the second quadrant. In the example, the controller 42 may determine which region the triangle object is located in when receiving the response signals from both the directional radar sensors 40A and 40B, and which region the rhombus object is located in when receiving the response signals from both the directional radar sensors 40B and 40C, and ignore the circle object and the square object since no response signal is received by the directional radar sensor 40B.

Therefore, the location detection system 11 may employ three directional radar sensors to detect an object in a square or rectangular-shape room using a narrow sweep bandwidth and a limited range resolution.

Figure 12:
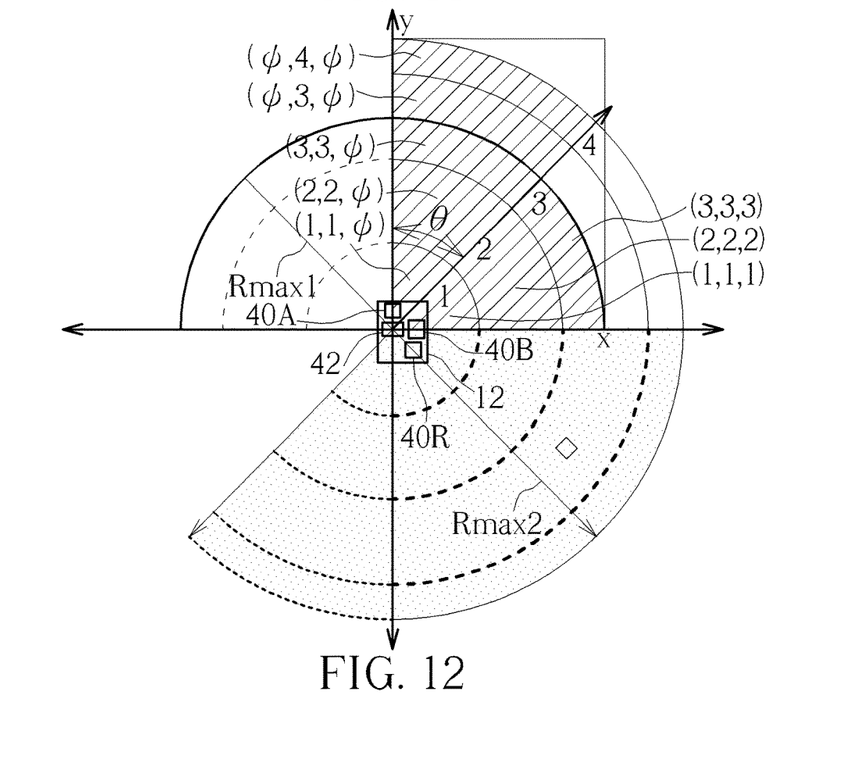
FIG. 12 is a top view of a location detection system according to another embodiment of the invention.

FIG. 12 is a top view of a location detection system 12 detecting locations of objects in a room according to another embodiment of the invention. The room may have a rectangular shape with a dimension of x by y, x being the width and y being the length. The location detection system 12 comprises the directional radar sensors 40A, 40B, 40R and the controller 42 coupled thereto, and may be installed at a corner of the rectangular room to detect objects therein.

The directional radar sensors 40R may be rotatable to provide a desired radio coverage. The direction that the directional radar sensor 40R faces is outside of the radio coverage of the directional radar sensor 40A. The respective radio coverage of the directional radar sensors 40A, 40B, 40R are partially overlapping with each other. The directional radar sensors 40A, 40B, 40R may cover identical or different radio ranges. The directional radar sensor 40A could be FMCW radar having a maximum radio range Rmax1 and a range resolution ΔR. The directional radar sensors 40B, 40R could be FMCW radar having a maximum radio range Rmax2 and the range resolution ΔR. The maximum radio range Rmax1 of the directional radar sensor 40A is smaller than the maximum radio range Rmax2 of the directional radar sensor 40B and the maximum radio range of the directional radar sensor 40R. The maximum radio range Rmax1 may be set to the width x, the maximum radio range Rmax2 may be set to the length y, thereby providing a quasi-rectangular radio coverage to the rectangular room. The maximum radio range Rmax1 may be divided into Zones 1 to 3 according to the range resolution ΔR, and the maximum radio range Rmax2 may be divided into Zones 1 to 4 according to the range resolution ΔR.

The directional radar sensors 40A, 40B, 40R are arranged next to each other facing different directions. That is, the facing direction of the directional radar sensor 40A and the facing direction of the directional radar sensor 40B are orthogonal, and the facing direction of the directional radar sensor 40B and the facing direction of the directional radar sensor 40R form an acute angle θ. Specifically, the directional radar sensors 40A and 40B face orthogonal directions, and the directional radar sensors 40B and 40R are arranged at the acute angle θ between 0° and 90°. The angle θ may be expressed by Equation (3):

$$\theta = \tan^{-1}\frac{x}{\sqrt{y^2 - x^2}},\quad\text{Equation (3)}$$

where x is the width of the rectangular room; and
y is the length of the rectangular room.

The controller 42 may select a region the object is located from at least three overlapping regions. The at least three overlapping regions may all be represented by the dashed areas in the first quadrant. The dashed areas in the first quadrant may be further divided into Sub-zones (1,1, ϕ), (2,2, ϕ), (3,3, ϕ), (1,1,1), (2,2,2), (3,3,3), (ϕ,3, ϕ), (ϕ,4, ϕ), and each set of the coordinates represents a Sub-zone in FIG. 12, wherein the first, second and third coordinates in each set of coordinates respectively represent reception statuses of the directional radar sensors 40A, 40B and 40R, numbers 1 to 4 respectively represent an object having been detected in Zones 1 to 4, and Symbol ϕ represents an empty set or no object being found by the directional radar sensor 40A, 40B or 40R. For example, the directional radar sensors 40A, 40B, 40R may receive response signals corresponding to Zone 2, and the controller 42 may determine that an object is located in Sub-zone (2,2,2). In another example, the directional radar sensors 40A and 40R may receive no response signal and the directional radar sensor 40B may receive a response signal corresponding to Zone 3, and the controller 42 may determine that an object is located in Sub-zone (ϕ,3, ϕ). The Sub-zones (1,1, ϕ), (2,2, ϕ), (3,3, ϕ) may form a first overlapping region of the at least three overlapping regions, the Sub-zones (1,1,1), (2,2,2), (3,3,3) may form a second overlapping region of the at least three overlapping regions, and the Sub-zones (ϕ,3, ϕ), (ϕ,4, ϕ) may form a third overlapping region of the at least three overlapping regions.

The controller 42 may determine which region an object is located in when receiving response signals by at least the directional radar sensors 40A and 40B, or when receiving response signals by the directional radar sensor 40B but not by the directional radar sensors 40A and 40R. That is, the controller 42 may determine the location only for an object in the dashed area in the first quadrant. When both the directional radar sensors 40A and 40B receive response signals but the directional radar sensor 40R receives no response signal, the controller 42 may determine that an object is located in the first overlapping region. When all the directional radar sensors 40A, 40B, 40R receive response signals, the controller 42 may determine that an object is located in the third overlapping region. When only the directional radar sensor 40B receives a response signal, the controller 42 may determine that an object is located in the second overlapping region. The controller 42 may further determine a more precise Sub-zone the object is located in by the Sub-zone number indicated by one or more response signals by the directional radar sensors 40A, 40B, 40R. Through-wall detection may be disabled by ignoring any object detected in the second quadrant and the third quadrant.

In other embodiments, the location detection system 12 may be used to detect objects inside and outside the room. The controller 42 may select a region the object is located from at least two non-overlapping regions and the at least three overlapping regions. The at least two non-overlapping regions may be the blank area in the second quadrant, and the dotted area in the third quadrant and the fourth quadrant.

Therefore, the location detection system 12 may employ three directional radar sensors to detect an object in a rectangular-shape room using a narrow sweep bandwidth and a limited range resolution.

Figure 13:
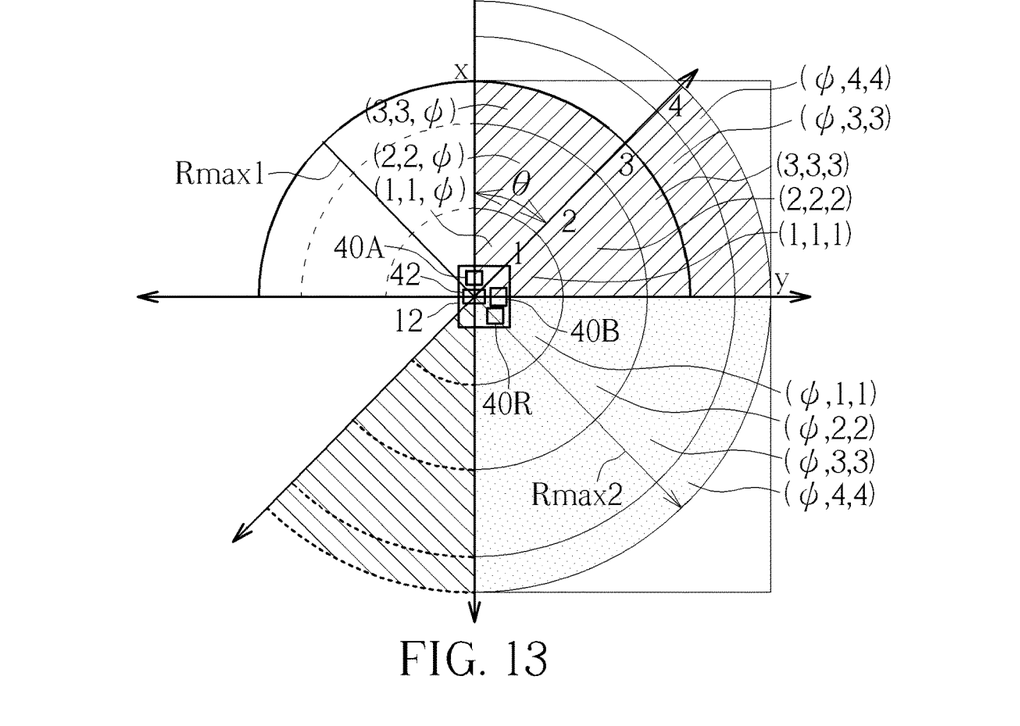
FIG. 13 is a top view of a location detection system according to another embodiment of the invention.

FIG. 13 is a top view of a location detection system 13 detecting locations of objects in a room according to another embodiment of the invention. The room may have a rectangular shape with a dimension of y by x, y being the width and x being the length. The location detection system 13 comprises the directional radar sensors 40A, 40B, 40R and the controller 42 coupled thereto, and may be installed at any location on a wall of the rectangular room to detect objects therein. The configurations of the directional radar sensors 40A, 40B, 40R and the controller 42 are similar to FIG. 12. The maximum radio range Rmax1 of the directional radar sensor 40A is smaller than the maximum radio range Rmax2 of the directional radar sensor 40B and the maximum radio range of the directional radar sensor 40R. The maximum radio range Rmax1 may be set to x, and the maximum radio range Rmax2 may be set to y, thereby providing a quasi-rectangular radio coverage to the rectangular room. The directional radar sensors 40B and 40R may be arranged at an acute angle θ between 0° and 90°. The angle θ may be expressed by Equation (4):

$$\theta = \tan^{-1}\frac{\sqrt{y^2 - x^2}}{x},\quad\text{Equation (4)}$$

where y is the width of the rectangular room; and
x is the length of the rectangular room.

The controller 42 may determine which region an object is located in when receiving response signals by at least the directional radar sensors 40B and 40R, or when receiving response signals by the directional radar sensors 40A and 40B but not by the directional radar sensor 40R. That is, the controller 42 may only determine the location for an object in the dashed area in the first quadrant and the dotted area in in the fourth quadrant. Through-wall detection may be disabled by ignoring any object detected in the second quadrant and the third quadrant.

The dashed areas in the first quadrant may be further divided into Sub-zones (1,1, ϕ), (2,2, ϕ), (3,3, ϕ), (1,1,1), (2,2,2), (3,3,3), (1,1,1), (2,2,2), (3,3,3), (4,4,4), and the dotted area in in the fourth quadrant may be further divided into Sub-zones (ϕ,1,1), (ϕ,2,2), (ϕ,3,3), (ϕ,4,4). Each set of the coordinates represents a sub-zone in FIG. 13, wherein the first, second and third coordinates in each set of the coordinates respectively represent reception statuses of the directional radar sensors 40A, 40B and 40R, numbers 1 to 4 respectively represent an object has been detected in Zones 1 to 4, and Symbol ϕ represents an empty set or no object being found by the directional radar sensor 40A, 40B or 40R. The controller 42 may further determine a more precise Sub-zone the object is located in by the Sub-zone number indicated by one or more response signals by the directional radar sensors 40A, 40B, 40R.

Therefore, the location detection system 13 may employ three directional radar sensors to detect an object in a rectangular-shape room using a narrow sweep bandwidth and a limited range resolution.

Figure 14:
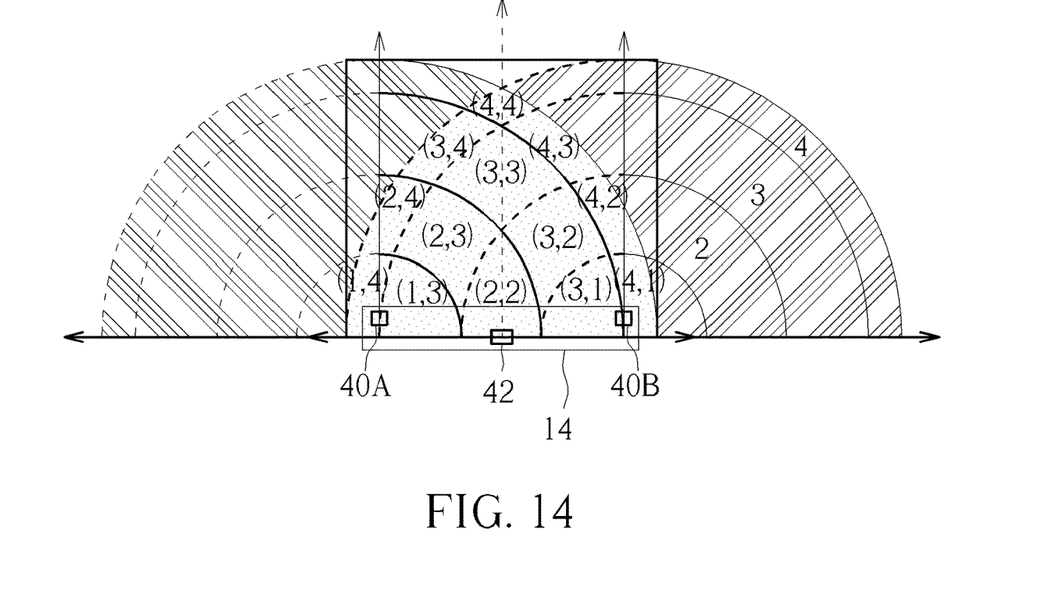
FIG. 14 is a top view of a location detection system according to another embodiment of the invention.

FIG. 14 is a top view of a location detection system 14 detecting locations of objects in a rectangular room according to another embodiment of the invention. The location detection system 14 comprises the directional radar sensors 40A, 40B and the controller 42 coupled thereto, and may be installed at near two corners of the rectangular room to detect objects therein. The directional radar sensors 40A, 40B could be FMCW radar having a maximum radio range Rmax and a range resolution ΔR, and the maximum radio range Rmax may be divided into Zones 1 to 4. The directional radar sensors 40A, 40B are separated by a distance and face substantially identical directions. In another embodiment, when the location detection system is used in a smart speaker having a left speaker and a right speaker, the directional radar sensor 40A may be disposed at the right speaker and the directional radar sensor 40B may be disposed at the left speaker.

The controller 42 may determine which region an object is located in according to receptions of the respective response signals of the directional radar sensors 40A and 40B. The rectangular room may be further divided into Sub-zones (1,3), (1,4), (2,2), (2,3), (2,4), (3,1), (3,2), (3,3), (3,4), (4,1), (4,2), (4,3), (4,4), each set of the coordinates represents a sub-zone in FIG. 14, wherein the first and second coordinates in each set of coordinates respectively represent reception statuses of the directional radar sensors 40A, 40B, numbers 1 to 4 respectively represent an object has been detected in Zones 1 to 4, and Symbol φ represents an empty set or no object being found by the directional radar sensor 40A or 40B. For example, the directional radar sensor 40A may receive a response signal corresponding to Zone 2 and the directional radar sensor 40B may receive a response signal corresponding to Zone 3, and the controller 42 may determine that an object is located in Sub-zone (2,3). In another example, the directional radar sensor 40A may receive no response signal and the directional radar sensor 40B may receive a response signal corresponding to Zone 3, and the controller 42 may determine that an object is located in Zone 3 outside the wall that the directional radar sensor 40B is attached to. Through-wall detection may be disabled by ignoring any object detected by only one of the directional radar sensor 40A or 40B.

Therefore, the location detection system 14 may employ three directional radar sensors to detect an object in a rectangular-shape room using a narrow sweep bandwidth and a limited range resolution.

The location detection systems 4, 10 to 14 may adopt code division multiple sensing (CDMS), frequency division multiple sensing (FDMS) or time division multiple sensing (TDMS) to transmit the transmission signals and receive the response signals. When CDMS is adopted in the location detection systems 4, 10 to 14, each of the directional radar sensors may adopt a unique identification code for transmission of the transmission signal and reception of the response signal. When FDMS is adopted in the location detection systems 4, 10 to 14, each of the directional radar sensors may transmit the transmission signal and receive the response signal indifferent radio channels. When TDMS is adopted in the location detection systems 4, 10 to 14, each of the directional radar sensors may transmit the transmission signal and receive the response signal in different designated time slots. When CDMS or FDMS is adopted in the location detection systems 4, 10 to 14, the directional radar sensors may operate simultaneously and continuously to receive respective response signals, and the controller may concurrently determine which region an object is located. When TDMS is adopted in the location detection systems 4, 10 to 14, the directional radar sensors may operate sequentially to receive respective response signals, and the controller may determine which region an object is located upon completion of the sequential reception of the respective response signals.

Although the embodiments in FIGS. 4 to 14 are explained in terms of FMCW radar, it should be understood that CW radar are also applicable to the embodiments.

The location detection systems in FIGS. 4 to 14 may detect the location of an object in a room by employing only limited bandwidth and no complicated angle measurement, while preventing undesirable through-wall detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A location detection system, comprising:
   a first directional radar sensor having a first facing direction and a first radio coverage correspondingly, and configured to receive a first response signal upon detecting an object;
   a second directional radar sensor having a second facing direction and a second radio coverage correspondingly, and configured to receive a second response signal upon detecting the object, the second radio coverage being partially overlapping with the first radio coverage; and
   a controller configured to determine which region the object is located in according to receptions of the first response signal and/or the second response signal, wherein
   the region is selected from at least one overlapping region and at least two non-overlapping regions, and the at least one overlapping region comprises an overlapping area formed by the first radio coverage and the second radio coverage, and wherein
   the controller determines that the object is located in one of the at least two non-overlapping regions when receiving the first response signal but not the second response signal, or when receiving the second response signal but not the first response signal.

2. The location detection system of claim 1, wherein the controller determines that the object is located in the at least one overlapping region when receiving the first response signal and the second response signal.

3. The location detection system of claim 1, wherein the first directional radar sensor and the second directional radar sensor are arranged next to each other so that the first facing direction and the second facing direction are different and coplanar.

4. The location detection system of claim 3, wherein the first facing direction and the second facing direction are orthogonal.

5. The location detection system of claim 1, further comprising:
   a third directional radar sensor having a third facing direction and a third radio coverage correspondingly, and configured to receive a third response signal upon detecting the object, the third radio coverage is partially overlapping with the second radio coverage;
   wherein the controller is configured to determine which region the object is located in according to receptions of the first response signal, the second response signal and/or the third response signal.

6. The location detection system of claim 5, wherein the region the object is located in is selected from at least two overlapping regions and at least two non-overlapping regions, and wherein the at least two overlapping regions comprise the overlapping area formed by the first radio coverage and the second radio coverage and further comprise an overlapping area formed by the second radio coverage and the third radio coverage overlap.

7. The location detection system of claim 5, wherein the first directional radar sensor, the second directional radar sensor and the third directional radar sensor are arranged next to each other so that the first facing direction, the second facing direction and the third facing direction are different and coplanar.

8. The location detection system of claim 5, wherein the first facing direction and the second facing direction are orthogonal, and the second facing direction and the third facing direction are orthogonal.

9. The location detection system of claim 5, wherein the third radio coverage does not overlap with the first radio coverage, and the controller determines which region the object is located in when receiving the second response signal and one of the first response signal and the third response signal.

10. The location detection system of claim 5, wherein the first facing direction and the second facing direction are orthogonal, and the second facing direction and the third facing direction form an acute angle.

11. The location detection system of claim 10, wherein the region the object is located in is selected from at least three overlapping regions and at least two non-overlapping regions; and wherein
the at least three overlapping regions comprise the overlapping area formed by the first radio coverage and the second radio coverage, an overlapping area formed by the second radio coverage and the third radio coverage, and an overlapping area formed by the third radio coverage and the first radio coverage.

12. The location detection system of claim 10, wherein the third radio coverage is partially overlapping with the first radio coverage, and the controller determines which region the object is located in when receiving at least the first response signal and the second response signal, or when receiving the second response signal but not the first response signal and the third response signal.

13. The location detection system of claim 12, wherein a maximum radio range of the first radio coverage is smaller than a maximum radio range of the second radio coverage and a maximum radio range of the third radio coverage.

14. The location detection system of claim 13, wherein the acute angle is $$\tan^{-1}\frac{\sqrt{y^2-x^2}}{x},$$

and the direction the third facing direction is outside of the first radio coverage;
wherein x is a maximum radio range of the first directional radar sensor, and y is a maximum radio range of the second directional radar sensor.

15. The location detection system of claim 10, wherein the acute angle is $$\tan^{-1}\frac{x}{\sqrt{y^2-x^2}},$$

and the third facing direction is outside of the first radio coverage;
wherein x is a maximum radio range of the first directional radar sensor, and y is a maximum radio range of the second directional radar sensor.

16. The location detection system of claim 10, wherein the third radio coverage is partially overlapping with the first radio coverage, and the controller determines which region the object is located in when receiving at least the second response signal and the third response signal, or when receiving the first response signal and the second response signal but not the third response signal.

17. The location detection system of claim 16, wherein a maximum radio range of the first radio coverage is smaller than a maximum radio range of the second radio coverage and a maximum radio range of the third radio coverage.

18. The location detection system of claim 1 wherein the first directional radar sensor and the second directional radar sensor have a same maximum radio range.

19. The location detection system of claim 1, wherein the first directional radar sensor and the second directional radar sensor are frequency-modulated continuous wave radar sensors.

* * * * *